Figure 1:
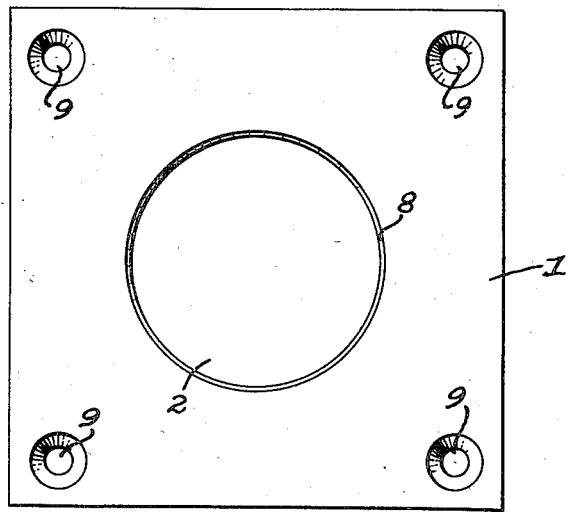
Figure 2:
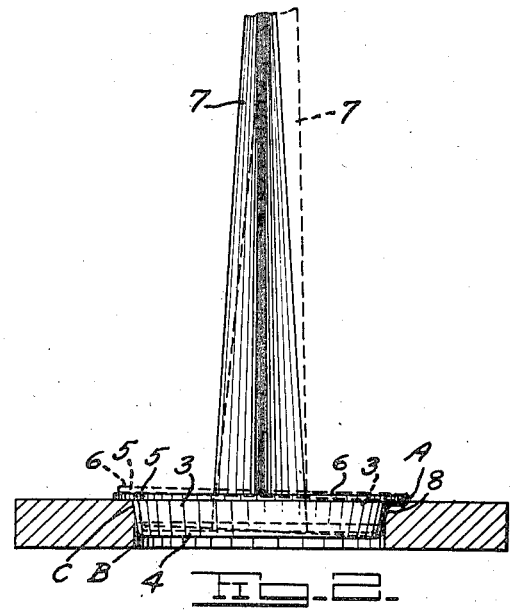

March 16, 1937.    G. E. GAUS    2,074,069
HOLDER FOR BALE IDENTIFICATION TAGS

Filed Jan. 29, 1935

INVENTOR
G. E. GAUS

BY    ATTORNEY

Patented Mar. 16, 1937

2,074,069

UNITED STATES PATENT OFFICE 2,074,069

HOLDER FOR BALE IDENTIFICATION TAGS

George E. Gaus, Washington, D. C., dedicated to the free use of the Public

Application January 29, 1935, Serial No. 3,947

2 Claims. (Cl. 100—14)

(Granted under the act of March 3, 1883, as amended April 30, 1928; 370 O. G. 757)

This application is made under the act approved March 3, 1883, as amended by the act of April 30, 1928, and the invention herein described may be manufactured and used by or for the Government for governmental purposes without the payment to me of any royalty thereon.

I hereby dedicate the invention herein described to the free use of the public, to take effect upon the granting of a patent to me.

My invention relates to that class of holders employing a socket having unyielding walls designed to secure by coaction the engagement, retention and release of an identification tag assembly, comprising a substantially rigid anchoring means firmly affixed to a tag head.

The object of my invention is to provide a reasonably secure retention for the head of the tag assembly when its anchoring means is subjected to moderate lateral draft, yet which will permit the release of the tag head by application of forcible rocking motion or axial draft to the anchoring means.

In order to carry out the purposes of my invention, reference is to be had to the peculiar combination and arrangement of parts as shown in the accompanying drawing, forming a part of this specification, in which similar numerals refer to similar parts throughout the several views.

Figure I is a plan view of my identification tag holder, and

Figure II is a section through the center of my tag holder illustrating the method of engagement of the head of the identification tag assembly with my holder, the anchoring means being shown in fragmentary elevation for convenience in illustration.

Referring to the drawing, plate 1 formed of suitable wear resistant material, is provided with a socket 2 adapted to engage tag head 3 of the tag assembly 3–7.

The tag assembly 3–7 is provided with a tag head 3, comprising base 4, flange 5 and rim flange 6, said tag head being firmly affixed to a substantially rigid V-form anchoring means 7.

The socket 2 is provided with a slightly outwardly tapered wall 8, dimensioned to an easy force fit with flange 5 of tag head 3.

For proper coaction of tag head 3 with socket 2 in effecting its release from said socket, the distance, taken through the center of tag head 3, between the junction point A, of rim flange 6 with the outer wall of flange 5, to the junction point B, of the outer wall of flange 5 with base 4, shall be slightly less than the distance from the point A to the diametrically opposed point C. It is necessary to maintain the above-mentioned dimensional relations in order to provide for the clearance of base 4 from socket 2 when the tag assembly 3–7, having its anchoring means 7 secured within the confines of the completed bale, is dislodged from the holder by releasing the pressing platen pressure from the bale, and subjecting the bale to forcible rocking motion as practiced in the conventional method of baling.

For the purpose of explanation of the method of operation of my device in connection with an identification tag as covered by U. S. Letters Patent No. 1,922,799, dated Aug. 15, 1933, tag assembly 3–7 as illustrated in the drawing will be discussed.

My invention may be practiced by mounting plate 1 by means of screws (not shown) in screw holes 9, on the movable or fixed pressing platens of a conventional bale press-box (not shown), which position will permit completion of the process of affixing identification tags. The operation of my device will be described as being mounted on the movable pressing platen of the conventional bale press-box. When plate 1 is thus mounted, engagement of tag assembly 3–7 with plate 1 is effected by inserting tag head 3 within the confines of tapered wall 8 of socket 2, thence applying pressure downwardly on anchoring means 7 and/or tag head 3 causing flange 5 of tag head 3 to bear forcibly against tapered wall 8 of socket 2, insuring reasonably secure retention of tag head 3. Downward movement of tag assembly 3–7 is ultimately arrested by contact of rim flange 6 with the upper surface of plate 1. At the inception of the process of baling tag head 3 is engaged with socket 2 and is secured therein by surface contact between flange 5 and tapered wall 8, the bale covering is forced downwardly on anchoring means 7 and in contact with plate 1. The material to be baled is introduced into the bale press-box and the process of baling is performed in the conventional manner. The customary process of baling effects the envelopment and impaction of tag anchoring means 7 with the material being baled, thereby arresting removal of the tag assembly 3–7 from the confines of the baled material.

Release of tag head 3 from contact with tapered wall 8 may be effected by forcibly applying lateral draft, from various angles to anchoring means 7. Application of forcible lateral draft to anchoring means 7, would result in the normal function of removing a completed bale having tag assembly 3–7 affixed thereto, from a conventional baling press. Plate 1 remains attached to the baler pressing platen.

It is obvious that minor changes may be made in the details of construction and the arrangement of the parts without departing from the spirit of the invention as set forth in the appended claims.

Having thus described my invention, what I claim for Letters Patent is:

1. An identification device consisting of a substantially non-resilient plate-like tag holder having an outwardly tapered inner-walled socket member formed therein adapted to be interiorly affixed to a pressing platen of a baler, a nail-like identification tag having a tapered head formed thereon adapted for engagement with said socket member, said tapered inner-walled socket member adapted to receive and secure in periphractic frictional contact the head of said tag during engagement of the tag with the material as the same is being formed into a bale, and adapted to coactively permit the release of the tag from said holder upon completion of the normal process of baling.

2. An identification device consisting of a substantially non-resilient plate-like tag holder having an outwardly tapered socket member formed therein adapted to be interiorly affixed to a pressing platen of a baler, a nail-like identification tag, said holder adapted to engage and to retain the head of said identification tag in a plane substantially coincident with one of the outer surfaces of the mass of material being baled and at a normal to the plane of movement of said material during engagement of the tag with said material, and adapted to ultimately permit the release of the tag head from the holder upon removal of the finished baled material from the baler.

GEORGE E. GAUS.